United States Patent
Jennas, II et al.

(10) Patent No.: US 8,572,339 B2
(45) Date of Patent: Oct. 29, 2013

(54) VARIABLE DATA PRESERVATION PREWRITE

(75) Inventors: Paul A. Jennas, II, Tucson, AZ (US);
Jason L. Peipelman, Vail, AZ (US);
Joshua Marshall Rhoades, Idaho Falls, ID (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 12/950,726

(22) Filed: Nov. 19, 2010

(65) Prior Publication Data

US 2012/0131292 A1 May 24, 2012

(51) Int. Cl.
*G06F 12/16* (2006.01)

(52) U.S. Cl.
USPC .......................................... 711/162; 711/161

(58) Field of Classification Search
None
See application file for complete search history.

(56) References Cited

U.S. PATENT DOCUMENTS

| | | | |
|---|---|---|---|
| 7,493,458 | B1 | 2/2009 | Kemeny et al. |
| 7,716,183 | B2 | 5/2010 | Lee |
| 2006/0143412 | A1 | 6/2006 | Armangau |
| 2006/0236051 | A1* | 10/2006 | Haruma et al. ............... 711/162 |
| 2008/0072003 | A1 | 3/2008 | Vu et al. |
| 2010/0138391 | A1* | 6/2010 | Namikawa et al. ........... 707/640 |

OTHER PUBLICATIONS

"DFSMS Advanced Copy Services", IBM Corporation, Document No. SC35-0428-14, Sep. 2008, Part 5 Flash Copy, pp. 433-482.
R. Ripberger, "IBM System Storage DS8000 Storage Virtualization Overview", IBM Corporation, 2009, pp. 1-53.
"DFSMS Advanced Copy Services", IBM Corporation, Document No. SC35-0428-14, Sep. 2008, section 1, pp. 1-213.
"DFSMS Advanced Copy Services", IBM Corporation, Document No. SC35-0428-14, Sep. 2008, section 2, pp. 214-392.
"DFSMS Advanced Copy Services", IBM Corporation, Document No. SC35-0428-14, Sep. 2008, section 3, pp. 393-578.

(Continued)

*Primary Examiner* — Than Nguyen
(74) *Attorney, Agent, or Firm* — William K. Konrad; Konrad Raynes Davda & Victor LLP

(57) ABSTRACT

In one aspect of the present description, a data preservation function is provided for preserving a set of data on a source storage device at a point in time, and includes identifying as a function of prior update usage, such as input/output usage, of the data to be preserved, a portion of the data which is more likely to be the subject of updates during at least a portion of the data preservation operation as compared to the remaining portion of the data to be preserved, and copies the identified portion of the data to be preserved to a target storage device. In another aspect, the size of the portion of data to be identified is variable. In one embodiment, the size of the portion of data to be identified is a function of a parameter of the command, such that a user can specify the command parameter which affects the size of the portion of data which is prewritten to the target storage device. The parameter may be, for example, a percentage of the data to be preserved, such that a user can specify the percentage of the point-in-time data which is prewritten to the target storage device. Alternatively, the parameter may be, for example, a probability of a collision occurring, such that a user can specify a probability of a collision occurring. Other features and aspects may be realized, depending upon the particular application.

12 Claims, 4 Drawing Sheets

(56) References Cited

OTHER PUBLICATIONS

D. Connor, "IBM Adds Teeth to Shark Enterprise Storage System", Network World, Dec. 18, 2000.

"DFSMS Advanced Copy Services", IBM Corporation, Document No. SC35-0428-14, Sep. 2008, section 4, pp. 579-708.

U.S. Appl. No. 13/472,919, filed May 16, 2012, entitled "Variable Data Preservation Prewrite", by inventors P.A. Jennas, II, J.L. Peipelman, J.M. Rhoades, and M.J. Ward.

Preliminary Amendment filed May 16, 2012, pp. 1-6, for U.S. Appl. No. 13/472,919, filed May 16, 2012, entitled "Variable Data Preservation Prewrite", by inventors P.A. Jennas, II, J.L. Peipelman, J.M. Rhoades, and M.J. Ward.

Office Action dated Mar. 1, 2013, pp. 1-19, for U.S. Appl. No. 13/472,919, filed May 16, 2012, by inventors P.A. Jennas, II, et al.

Response dated May 31, 2013, pp. 1-9, to Office Action dated Mar. 1, 2013, pp. 1-19, for U.S. Appl. No. 13/472,919, filed May 16, 2012, by inventors P.A. Jennas, II, et al.

Final Office Action dated Aug. 14, 2013, pp. 8, for U.S. Appl. No. 13/472,919, filed May 16, 2012, by inventors P.A. Jennas, II, et al. (18.377C1).

* cited by examiner

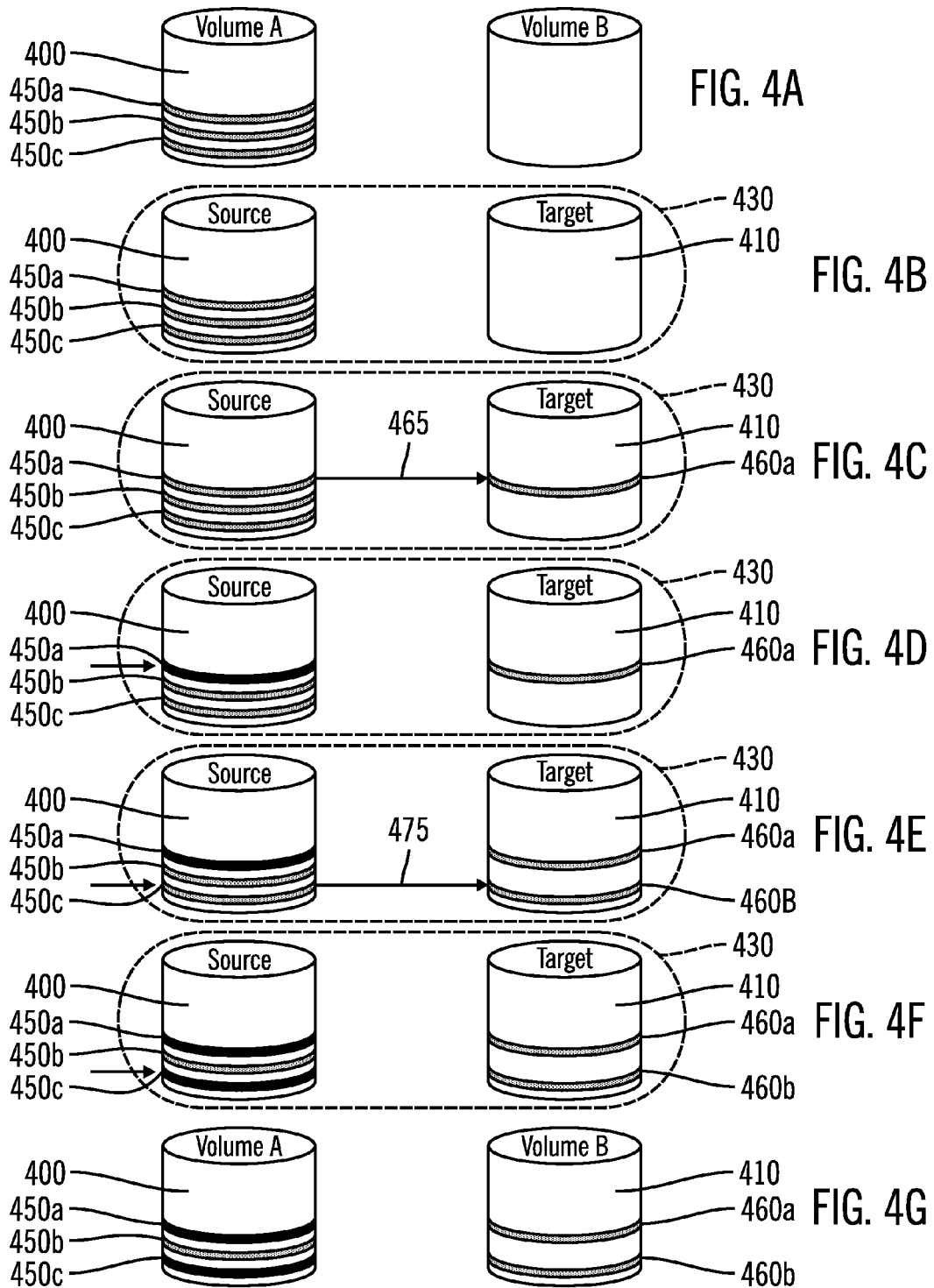

VARIABLE DATA PRESERVATION PREWRITE

BACKGROUND

1. Field

The present description relates to a method, system, and computer program for preserving a set of data in a storage area network.

2. Description of Related Art

One or more hosts may store large quantities of data in a group of storage units, which is typically controlled by a storage controller. An example of such a storage controller is the IBM TotalStorage® Enterprise Storage Server® (ESS). A storage controller such as the ESS may provide a number of functions accessible by the hosts for protecting data, backing the data up, and making the data available for use.

Amongst the functions which may be provided by a data controller is a data preservation function which can preserve an identified set of data at a particular point in time. For example, the ESS storage controller supports a data preservation function referred to as "FlashCopy" which enables a copy to be made of a set of tracks in a source volume. One feature of such data preservation functions is that the data of the copy is frequently made immediately available for read or write access. The identified data may be for example, a set of tracks which can consist of an entire volume, a data set, or just a selected set of tracks, for example.

If a host attempts to update the data on the source volume which is being preserved, that update is typically temporarily delayed until the old data to be updated is copied to a target volume for preservation. Such temporary update blocking or delaying is often referred to as a "collision" and can significantly slow updating of the source volume. This problem may be aggravated where the source volume is a relatively fast access volume such as a solid state drive such as flash memory, for example, and the target volume is a relatively slower access volume such as a hard disk drive, for example. Thus, the slower performance of the target drive may be imposed on the faster source volume while waiting for data to be successfully copied to the target volume.

In one mode of a data preservation function, a copy of all of the data to be preserved at the particular point in time, is made by copying the identified data from the source volume to the target volume, typically in a background copy mode. Once a particular data location of the set of identified data on the source volume has been successfully copied to the target volume by the background copy operation, that data location on the source volume is freed for subsequent immediate updating by a host. Hence, if the host subsequently updates that data location, the update may proceed without incurring a "collision" and thus may proceed without delay. Thus, as the background copy operation from the source volume to the target volume progresses, fewer and fewer source volume locations are blocked from immediate updates such that the collision rate can rapidly decrease.

However, for some data storage operations, copying all of the data to be preserved at a point in time may not be suitable. For example, some storage units are configured for improved data storage efficiency. Examples of efficiency configurations include the "Track Space Efficient" and "Extent Space Efficient" volume configurations often used in ESS data storage systems. A track "extent" typically contains a beginning track, an ending track, and all the tracks between the beginning track and the end track.

In such volume efficiency configurations, a different mode of operation may be used for a data preservation function. For example, instead of copying all of the data to be preserved at a point in time, a "block on write" paradigm may be followed. Accordingly, when a particular set of data is identified for preservation at a point in time, no copying of data need be done at that point. Instead a comparable set of space is made available for possible future writes on a target volume of sufficient size such that it can hold on the target volume the entire set of data identified for preservation if need be. If any write activity is done to update the identified set of data on the source volume, the write to the source volume is temporarily blocked while the old data at the location to be updated is first transferred to the target volume for preservation. After the transfer of that old data to be updated completes, the write to the source volume to update the now copied old data is then allowed to complete. However, the collision rate and performance impact can be substantially higher in this mode of data preservation.

SUMMARY

A data preservation function is provided for preserving a set of data on a source storage device at a point in time, and includes identifying as a function of prior update usage of the data to be preserved, a portion of the data which is more likely to be the subject of updates during at least a portion of the data preservation operation as compared to the remaining portion of the data to be preserved, and copies the identified portion of the data to be preserved to a target storage device.

In another embodiment, the data preservation function includes receiving a data preservation command identifying a set of data on a source storage device to be preserved at a point in time; and in response to the command, performing a data preservation operation including establishing a relationship between storage locations of the source storage device and a target storage device, identifying as a function of prior input/output usage of the data to be preserved, a portion of the data which is more likely to be the subject of updates during at least a portion of the data preservation operation as compared to the remaining portion of the data to be preserved; and prewriting the identified portion of the data to the target storage device.

In another aspect, the size of the portion of data to be identified is variable. In one embodiment, the size of the portion of data to be identified is a function of a parameter of the command, such that a user can specify the command parameter which affects the size of the portion of data which is prewritten to the target storage device.

In yet another aspect, the parameter may be a percentage of the data to be preserved, such that a user can specify the percentage of the point-in-time data which is prewritten to the target storage device.

In still another aspect, the parameter may be a probability of a collision occurring, such that a user can specify a probability of a collision occurring. In one embodiment, the specified probability affects the quantity of data prewritten to the target storage device.

Other features and aspects may be realized, depending upon the particular application.

BRIEF DESCRIPTION OF THE DRAWINGS

FIGS. 4a-4g illustrate an example of operations of a data preservation function in accordance with one embodiment of the present description.

DETAILED DESCRIPTION

Figure 1:
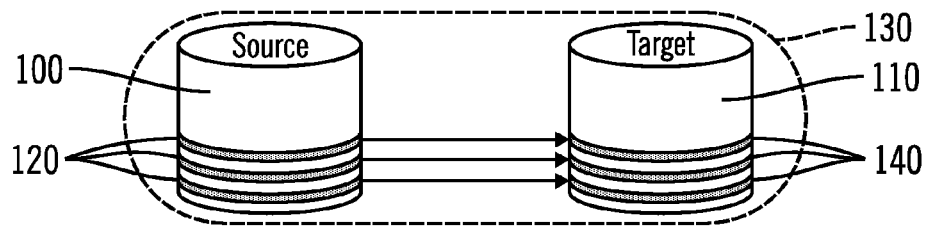
FIG. 1 illustrates operations of a prior art data preservation function in an "all copy" mode of operation.

FIG. 1 illustrates one example of one mode of operation of a prior art data preservation function, referred to herein as an "all copy" mode, in which a copy of all of the data to be preserved at a point in time, is made by copying the identified "point-in-time" data from a source volume 100 to a target volume 110, typically in a background copy mode. The source volume 100 and the target volume 110, as well as the set of data to be preserved, are typically identified in a data preservation request.

The point-in-time data to be preserved on the source volume 100 resides on particular tracks, indicated at 120 in FIG. 1. In one prior art device, a relationship 130 is established between those identified tracks 120 on the source volume 100 and corresponding tracks 140 on the target volume 140, in response to a data preservation request. The source tracks 120 for the point-in-time data to be preserved may reside in one or more track extents, each of which contains a beginning track, an ending track, and all the tracks between the beginning track and the end track.

In one prior art device, a contiguous set of source tracks related to a contiguous set of target tracks is referred to as a "track set." Each track set provides a data preservation relationship 130. In some prior art devices, a track set is described in terms of a source track extent and a target track extent. Thus one or more tracks may be identified to be preserved but each track set may require a source extent and a target extent in some prior art devices. The data preservation relationship 130 begins in response to a the data preservation request and ends when the background copy completes or in response to a withdrawal command.

As previously mentioned, in the "all copy" mode of the data preservation function depicted in FIG. 1, all tracks in the relationship 130 are physically copied from the source volume tracks 120 to the target volume tracks 140. In some prior art devices, the source tracks 120 are copied to the target volume 110 in the same track locations within the target volume 110 as the source tracks 120 within the source volume 100. In other prior devices, source tracks 120 may be copied to the target volume 110 in track locations specified in the data preservation function request.

As soon as the relationship 130 is established, user programs have access to two logical copies of the source data. Access to the point-in-time copy of the data on the source volume 100 is through reading the data from the target volume 110. Data that is read from the target storage device returns source track data from the point-in-time of the establishment of the "all copy" mode relationship 130. Access to the point-in-time data is provided without waiting for the copying of the point-in-time data to the target storage device to complete. If the point-in-time data requested from the target storage device has not yet been physically copied to the target volume 110, the point-in-time data is obtained from the source volume 100.

If a host attempts to update a location on the source volume 100 containing old point-in-time data while the "all copy" data preservation relationship 130 is still in effect, a "collision" will occur if that that old point-in-time data has not yet been physically copied to the target volume 110. Accordingly, the update to that location containing the old point-in-time data on the source volume 100 is delayed until the old point-in-time data is physically copied from that source location and therefore preserved on the target volume 110.

Conversely, if a host attempts to update a location on the source volume 100 containing old point-in-time data, a "collision" will be avoided if that that old point-in-time data has already been physically copied to the target volume 110. In such a case, the update to that location containing old point-in-time data on the source volume 100 proceeds without delay since the old point-in-time data has already been physically copied and therefore preserved on the target volume 110. Therefore, collisions tend to rapidly decrease in frequency in the "all copy" data preservation mode since all the old point-in-time data is in the process of being physically copied once the relationship 130 is established.

The data preservation relationship 130 ends for each track set when it is copied to the target volume 110. After the background copy is complete, the point-in-time data on the target storage device is the same as the point-in-time data on the source storage device when the data preservation relationship 130 was first established. However, if data is written to a track that is a target track that was in the data preservation relationship 130, a read to the updated target track returns the user-updated data, and not the point-in-time source track data. Thus, target tracks are withdrawn from the data preservation relationship 130 as soon as any application writes to these tracks. Similarly, updates to the source volume after the relationship 130 is established are not part of the point-in-time copy on the target storage device.

In some prior art devices, it is a requirement of the data preservation function that the entire source volume and target volume be involved in the data preservation relationship, even if selected tracks were specified in the data preservation request or command.

FIGS. 2a-2e illustrate one example of another mode of operation of a prior art data preservation function for point-in-time data in connection with a source storage device 200 (FIG. 2a) and a target storage device 210. In this example, the data preservation function establishes a data preservation relationship 230 (FIG. 2b) for a track set of the source storage device 200 and the target storage device 210 without immediately initiating a physical copy of point-in-time data from the source storage device 200 to the target storage device 210. Hence, this mode is referred to as a "no copy" mode. The "no copy" mode of a data preservation function is useful in those applications where space efficiency is emphasized.

In the example of FIGS. 2a-2e, the point-in-time data on the source storage device 200 is stored on source tracks represented by tracks 250a, 250b, 250c. In establishing the relationship 230, a set of space comparable to that occupied by the identified point-in-time data of the source storage device 200, is made available on the target storage device 210 and is of sufficient size such that it can hold on the target storage device 210 the entire set of point-in-time data identified for preservation if need be.

As previously mentioned, the data preservation function establishes the data preservation relationship 230 for a track set of the source storage device 200 and the target storage device 210 without immediately initiating a physical copy of point-in-time data from the source storage device 200 to the target storage device 210. Hence, the space made available on the target storage device 210 pursuant to the relationship 230 provides space for possible future writes up to the entire set of point-in-time data identified for preservation if need be.

The space made available on the target storage device 210 in association with the relationship 230 is actually used in response to a request to write new data to update old point-in-time data stored on the source storage device 200 and within the relationship 230. If any write activity is initiated to update a portion of the identified set of point-in-time data on the source volume, the write to the source volume is temporarily blocked while that particular old point-in-time data is first transferred to the target volume (FIG. 2*c*) for preservation ahead of the subsequent update. Thus, in the example of FIG. 2*c*, a write operation is requested to update the point-in-time data stored on the tracks 250*c* of the source storage device 200, resulting in a collision. Accordingly, the point-in-time data on tracks 250*c* is physically copied to tracks 260 of the target volume. After the transfer of that old point-in-time data from source storage device tracks 250*c* to target storage device tracks 260 completes, the write to the source storage device tracks 250*c* to update the now copied old data is allowed (FIG. 2*d*) to complete.

Figure 2A:
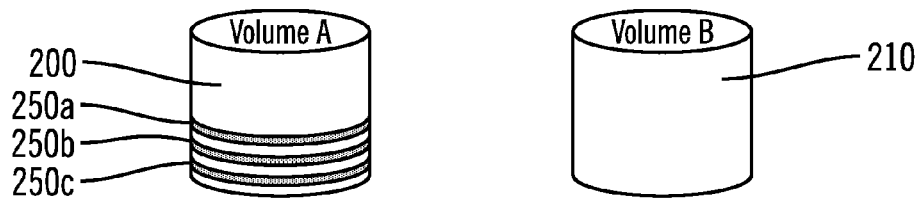
FIGS. 2a-2e illustrate operations of another prior art data preservation function in a "no copy" mode of operation.
Figure 2B:
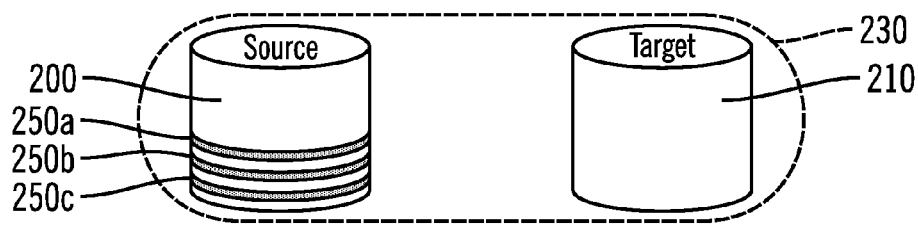
Figure 2C:
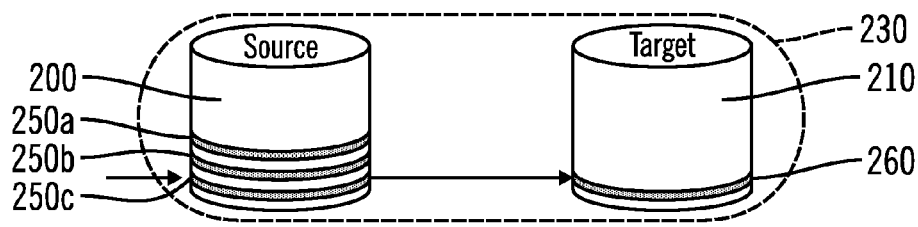
Figure 2D:
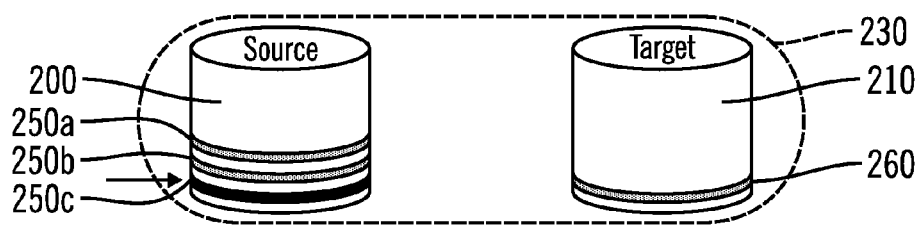
Figure 2E:
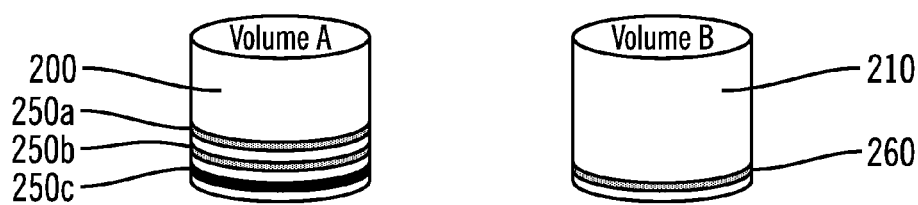

The remaining tracks 250*a*, 250*b* of the point-in-time data remain uncopied since they have not been updated to this point. Thus, the point-in-time data physically copied to the target storage device 210 is limited in this mode, to the point-in-time data of the source storage device which was updated. Thus, a collision occurs each time an update is to be performed on point-in-time data not previously updated. As a result, the collision rate and performance impact can be substantially higher in this mode of data preservation, until the data preservation relationship 230 is withdrawn, as shown in FIG. 2*e*.

In accordance with one aspect of the present description, a data preservation function is provided in which a variable quantity of point-in-time data is prewritten to the target storage device in a point-in-time data preservation operation. In one embodiment, a user may specify a parameter which can define, for example, a particular quantity of point-in-time data that will be prewritten to the target storage device in a point-in-time data preservation operation. The quantity of data to be prewritten may be expressed in terms of a percentage of the entire point-in-time data, for example.

This mode is referred to herein as a "variable prewrite" mode of a data preservation function. In one embodiment, the particular point-in-time data chosen for this prewrite, may be selected automatically by the storage system based on its predicted future usage characteristics. For example, the point-in-time data most likely to be written to in the near future may be prioritized for the prewrite operation.

As a result, it is believed that the frequency of collisions, and thus write impact to a host when writing to the source volume or storage device, may be significantly reduced. Such a reduction may be particularly apparent if the source volume for the point-in-time data to be preserved is a faster storage device such as a solid state drive, and the target storage device is a slower storage device such as a hard disk drive, for example. However, it is appreciated that benefits including collision reduction may be realized in other types of systems including systems in which both the source and target are on identical storage media types. Other features and advantages may also be realized, depending upon the particular application.

As explained in greater detail, below, other parameters may be selected to control a data preservation function. For example a parameter may be provided which defines a limit on the probability of an initial update write operation causing a collision following establishment of a data preservation relationship. It is appreciated that other parameters may be selected for a variable prewrite mode of a data preservation function, depending upon the particular application.

Figure 3:
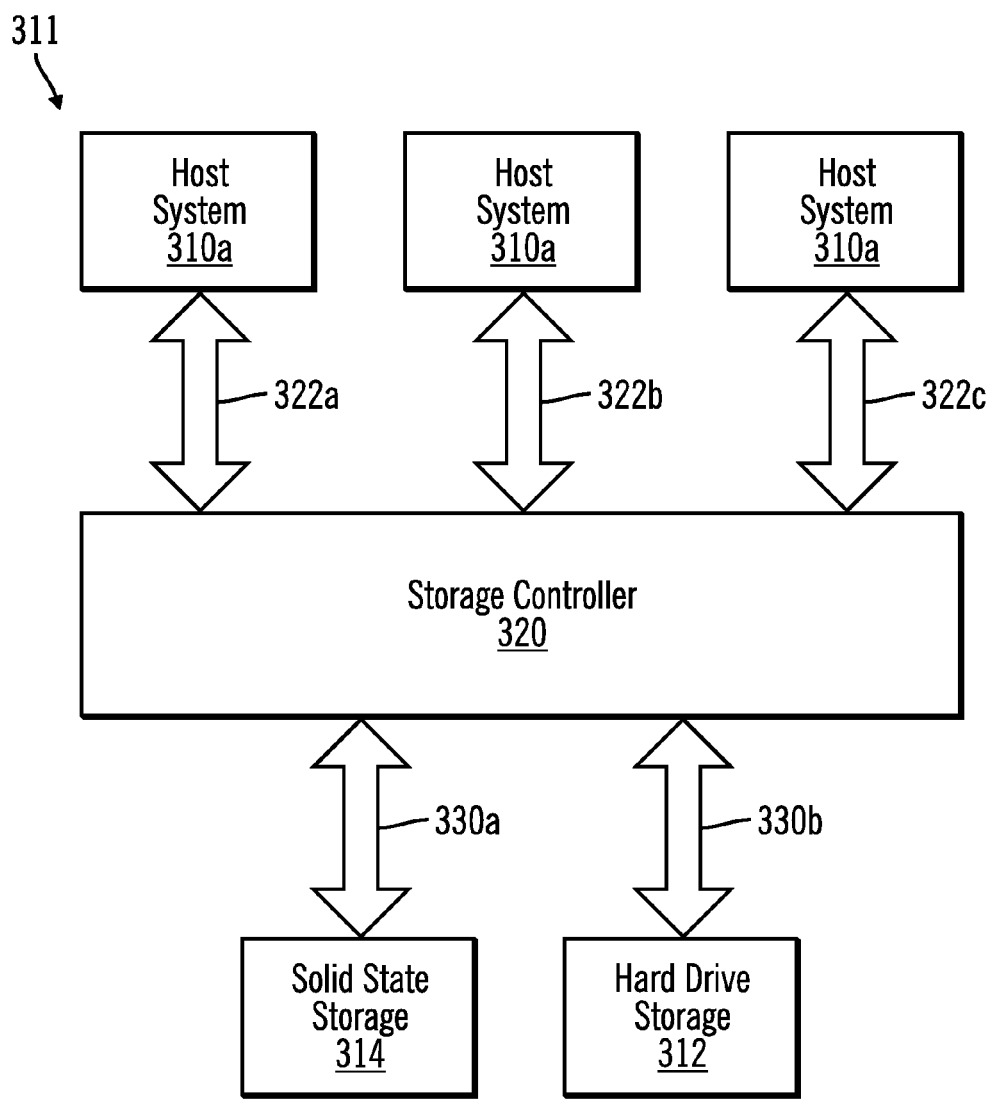
FIG. 3 illustrates an embodiment of a computing environment in which an aspect of the present description may be employed.

FIG. 3 illustrates an example of a hardware environment in which preferred embodiments may be implemented. A plurality of host systems 310*a*, 310*b*, 310*c* are in data communication with a storage area network (SAN) 311 which includes a plurality of storage devices such as hard disk storage 312 and solid state storage 314. The hosts 310*a*, 310*b*, 310*c* communicate with the storage devices 312, 314, via a storage controller 320 of the storage area network 311.

The hard disk storage 312 may include multiple direct access storage devices (DASDs) units for example. The solid state storage 314 may include multiple Flash memory units, for example. In this embodiment, the solid state storage 314 has a substantially faster access time as compared to that of the hard disk drive storage 312. It is appreciated that other types of storage may be used as well including tape drive storage.

The host systems 310*a*, 310*b*, 310*c* may be any host system known in the art, such as a mainframe computer, workstations, etc., including an operating system such as WINDOWS®, AIX®, UNIX®, MVS™, etc. AIX is a registered trademark of IBM; MVS is a trademark of IBM; WINDOWS is a registered trademark of Microsoft Corporation; and UNIX is a registered trademark licensed by the X/Open Company LTD. A plurality of channel paths 322*a*, 322*b*, 322*c* in the host systems 310*a*, 310*b*, 310*c* provide communication paths to the storage controller 320. The storage controller 320 and host systems 310*a*, 310*b*, 310*c* may communicate via any network or communication system known in the art, such as LAN, TCP/IP, ESCON®, SAN, SNA, Fibre Channel, SCSI, etc. ESCON is a registered trademark of International Business Machines Corporation ("IBM"). The host system 310*a*, 310*b*, 310*c* executes commands and receives returned data along a selected channel 322*a*, 322*b*, 322*c*. The storage controller 320 may issue commands to physically position the electromechanical devices to write data to or read data from the hard drive storage 312 via a communication path 330*a*. The storage controller 320 may also issue commands to write data to or read data from the solid state storage 314 via a communication path 330*b*.

FIGS. 4*a*-4*g* illustrate one example of operations of a variable prewrite data preservation function in connection with a source storage device 400 (FIG. 2*a*) and a target storage device 410. The source storage device 400 represents one or more source storage units and may include one or more different types of storage units including hard disk drives, tape drives, solid state drives, etc. Similarly, the target storage device 410 represents one or more target storage units and may include one or more different types of storage units including hard disk drives, tape drives, solid state drives, etc.

In this example, the data preservation function establishes a data preservation relationship 430 (FIG. 4*b*) for a track set of the source storage device 400 containing the point-in-time data to be preserved, and the target storage device 410. The point-in-time data on the source storage device 400 is stored on source tracks represented by tracks 450*a*, 450*b*, 450*c*.

The tracks of the source storage device 400 containing the point-in-time data to be preserved may comprise one or more units of storage or one or more fractions thereof. For example, the tracks of the source storage device 400 containing the point-in-time data to be preserved may comprise an entire volume, a portion of a volume or more than one volume. Also, the tracks of the source storage device 400 containing the point-in-time data to be preserved may comprise an entire extent, a portion of an extent or more than one extent. It is appreciated that the types of the units of storage of the relationship may vary, depending upon the particular application.

In establishing the relationship 430, a set of space comparable to that occupied by the identified point-in-time data of the source storage device 400, is made available on the target storage device 410 and is of sufficient size such that it can hold on the target storage device 410 the entire set of point-in-time data identified for preservation if need be. Hence, the space made available on the target storage device 410 pursuant to the relationship 430 provides space for possible future writes up to the entire set of point-in-time data identified for preservation if need be.

However, unlike the "no copy" mode described above in connection with FIGS. 2a-2e, following establishment of the data preservation relationship 430, a variable portion of the point-in-time data is prewritten to the target storage device as indicated in FIG. 4c. The portion of the point-in-time data being prewritten to the target storage device 410 is represented in FIG. 4c by the data on the tracks 450a of the source storage device 400. That data portion is prewritten to tracks 460a of the target storage device 410 as represented by the arrow 465. In the "variable prewrite" mode of FIGS. 4a-4g, unlike the "all copy mode" described above in connection with FIG. 1, the remaining portions of the point-in-time data, as represented by the remaining tracks 450b, 450c of the source storage device, are not automatically copied to the target storage device as indicated by the lack of arrows emanating from those tracks in FIG. 4c.

If any write activity is initiated to update a portion of the point-in-time data on tracks 450a, the update may proceed without causing a collision as shown in FIG. 4d. The old point-in-time data on tracks 450a has already been preserved by prewriting that data to the tracks 460a of the target storage device 410. In this example, the point-in-time data on tracks 450a was identified for prewriting to the target storage device pursuant to a user defined parameter. As a function of the specified parameter, that portion of point-in-time data which is more likely to be updated, may be selected for prewriting as shown in FIG. 4c. As a result, it is believed that the incidence of collisions may be reduced as shown in FIG. 4d.

In the example of FIG. 4c, only a portion (such as 10%, for example) of the entire space made available on the target storage device 410 in association with the relationship 430 is actually used by the tracks 460a for prewriting to the target storage device pursuant to the specified parameter. Thus, it is believed that a substantial reduction in collisions may be realized by prewriting into this small portion of the entire space made available on the target storage device 410 in association with the relationship 430. Thus, a variable prewrite preservation function in accordance with the present description may be of particular applicability to applications in which data storage efficiency is of increased concern.

The portion of the point-in-time data which is selected for prewriting may be selected as a function of a parameter such as user-specified percentage of the entire point-in-time data of the relationship 430. Thus, if a percentage of 10% is specified, for example, the point-in-time data may be ranked by likelihood of being updated and the top 10% of that data may be selected for prewriting pursuant to the 10% parameter. Other parameters may be used such as a limit on the likelihood of collisions following establishment of the relationship, for example.

In the example of FIGS. 4a-4d, the remaining portion of the point-in-time data which is not prewritten is represented by the remaining tracks 450b, 450c of the source storage device 400. However, the remaining space made available on the target storage device 410 in association with the relationship 430 may be used in response to a request to write new data to update old point-in-time data stored on the remaining tracks 450b, 450c source storage device 400 and within the relationship 430. If any write activity is initiated to update a portion of the non-prewritten point-in-time data on the source volume, the write operation to the source volume is temporarily blocked while that particular old point-in-time data is first transferred to the target volume (FIG. 4e) for preservation ahead of the subsequent update.

Thus, in the example of FIG. 4e, a write operation requesting updating the non-prewritten point-in-time data stored on the tracks 450c of the source storage device 400, results in a collision. Accordingly, the point-in-time data on tracks 450c is first physically copied to tracks 460b of the target volume as represented by the arrow 475. After the transfer of that old data to be updated completes, the write to the source volume to update the now copied old data is allowed (FIG. 4f) to complete on source storage device tracks 450c.

The remaining tracks 450b of the point-in-time data remain uncopied since they have not been either prewritten or updated to this point. Thus, the point-in-time data physically copied to the target storage device 410 is limited in this variable prewrite mode, to the prewritten point-in-time data on tracks 450a, and the non-prewritten point-in-time data on tracks 450c of the source storage device which were updated. Thus, a collision occurs each time an update is to be performed on point-in-time data not previously prewritten or updated. Nonetheless, it is believed that the collision rate and performance impact can be substantially reduced in this mode of data preservation by selective prewriting as described above, until the data preservation relationship 430 is withdrawn, as shown in FIG. 4g.

Figure 5:
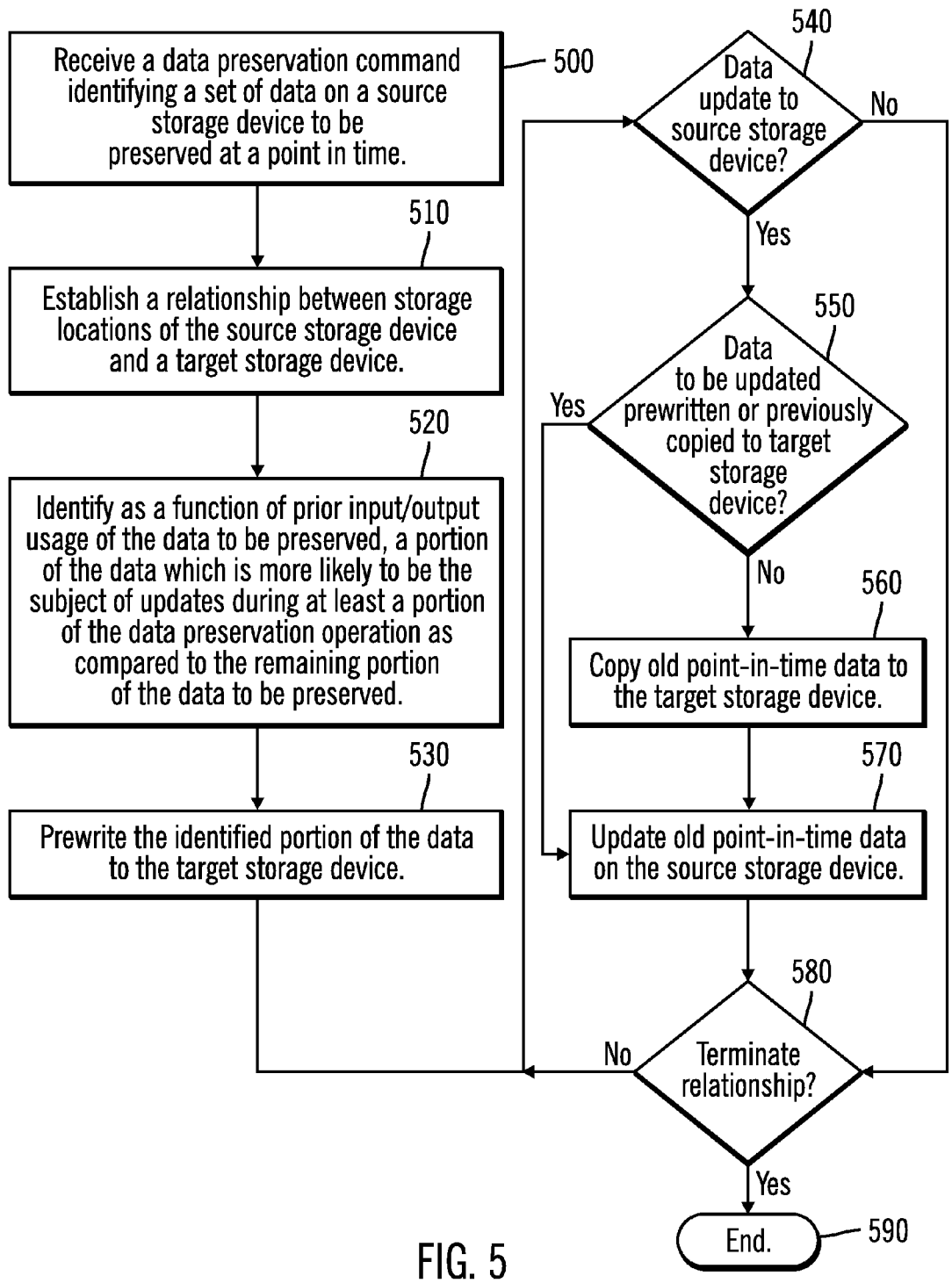
FIG. 5 illustrates another example of operations of a data preservation function in accordance with an embodiment of the present description.

FIG. 5 shows another example of operations for performing a data preservation function in accordance with one embodiment of the present description. In a first operation, a data preservation command is received (block 500). In this example, the command identifies a set of data on a source storage device to be preserved at a point in time. In response to the command various additional operations are performed to preserve the identified data.

In one operation, a relationship is established (block 510) between storage locations of the source storage device and a target storage device. FIG. 4b illustrates one example of such a relationship at 430.

In another operation, an identification is made (block 520), as a function of prior update usage, such as input/output usage of the data to be preserved, a portion of the data which is more likely to be the subject of updates during at least a portion of the data preservation operation as compared to the remaining portion of the data to be preserved. For example, the quantity of data to be preserved may be a function of a parameter of the command initiating the data preservation function.

For example, a data preservation function command may be called "mkflash", for example, and have a parameter which may be called "-prewrite percentage" for example. When this parameter is specified, it can indicate the percentage of the capacity of the source volume that will be prewritten to the target volume in order to reduce the incidence of collisions. For example, the command:

mkflash-tse-prewrite 10% sourceVol:targetVol can provide that the top 10% of the point-in-time data to be preserved from the source storage volume "sourceVol", that has the greatest likelihood of being written to in the near future, is prewritten (block 530) to the target volume "targetVol" in the background after the data preservation relationship is established. It is appreciated that a data preservation relationship may be applied to data storage quantities other than single volume and thus may include a quantity greater than one volume or a quantity which is a portion of a volume. Accordingly, the specified prewrite percentage may be applied as a percentage of data storage quantities other than a single volume.

Once the data to be prewritten is identified (block 520), that identified point-in-time data is prewritten (block 530) from the source storage device to the target storage device. If a host initiates a write operation to update (block 540) a storage location on the source storage device that is within the data preservation relationship, a determination is made (block 550) as to whether the data at that data location has already been prewritten or otherwise previously copied to the target storage device. If not, a collision has occurred and the old point-in-time data at that data location is first copied (block 560) to the target storage device before the data update (block 570) is permitted to proceed. On the other hand, if it is determined (block 550) that the data at that data location has already been prewritten or otherwise previously copied to the target storage device, a collision is avoided and the data update (block 570) is permitted to proceed without delay.

If it is determined (block 580) that the data preservation relation is to continue, any further updates to a storage location on the source storage device that is within the data preservation relationship is handled in accordance with blocks 540-580. If it is determined (block 580) that the data preservation relation is to not continue, the relationship is terminated (block 590).

Another example of a parameter for a data preservation function command is a parameter which specifies a likelihood of a collision occurring. For example, a parameter named "collisionprob percentage", for example could allow the user to specify in terms of likely write I/O impact the amount of data to prewrite. This parameter specifies the initial probability that any given write will cause a collision to occur when the relationship is first formed. The lower the percentage given for this option, the higher the amount of data that will be prewritten, and thus the lower the impact will be due to collisions for this relationship.

For example, the command:

mkflash-tse-collisionprob 20% sourceVol:targetVol will have as a goal, ensuring that there will be as small as a 20% probability that the initial write to the source volume will cause a collision.

It is noted that collisions for any given track is generally a one time occurrence for the host. Thus, once a collision occurs for a particular data location on the source storage device, the old point-in-time data will be written to the target. On a subsequent write to the same location, the old point-in-time data will have already been written to the target such that a collision will not occur. Thus it is believed that a collision probability may often represent the probability during a worst case scenario when no collisions have yet occurred (that is, when the relationship was just formed). Once collisions have occurred, the frequency will likely decrease over time.

Also, if the update write activity is determined to be uniformly distributed over the entire volume, and the collision likelihood parameter is specified to be 20%, for example, it is believed that 80% of the volume will likely be prewritten to reduce the probability of a collision to 20%. Once the prewriting of the first 80% in background copy occurs, there will be 20% of the volume left that is at risk to cause collisions. Thus, if the past usage history indicates that the volume is being updated uniformly, the percentage of capacity at risk for collisions is substantially equal to the percentage risk of collisions overall.

However, if the write activity on the source volume is more localized to certain parts of the volume, it is believed that substantially less than 20% of the volume may be prewritten in order to achieve the 20% acceptable collision probability. Thus, it is observed that the more localized the write activity of a volume, the less volume capacity likely needs to be prewritten to reduce the collision frequency to an acceptable level. In one embodiment, the percentage of the volume to be prewritten may be readily calculated by the storage controller as a function of the user specified percentage value and the frequency of updating observed for the various data locations of the source volume.

The prewriting of data may be provided over various sizes of subdivisions of the source and target storage devices. For example, if a subdivision size of an extent is chosen, upon forming the data preservation relationship in the variable prewrite mode, the storage controller will first evaluate the number of extents which will be transferred as a percentage of the size of the source volume. In one embodiment, the value may be rounded up to the next whole extent. Thus, if 20% prewrite was requested on a volume that was 8 extents in size, 2 extents (25%) may actually be prewritten.

Alternatively, the prewriting of data may be provided over a subset of tracks rather than a subset of extents, for example. By having a smaller subdivision and thus greater granularity, the storage controller may be better able to approach the user requested percentage. It is appreciated that the granularity of the input/output update frequency data may affect the subdivision size for prewriting. Thus, if the input/output update frequency data is generated on a per extent granularity, it may be suitable to perform prewrites at the same extent granularity, for example.

The storage controller may obtain the input/output update frequency data in a variety of suitable techniques. For example, a call may be made to query the head data for the extents that compose the source volume. This the input/output update frequency data may be stored on a per extent basis. A number of extents covering the requested volume percentage would then be marked for background copy in decreasing frequency order starting with the extent that is likely to have the most frequent updating.

It is further appreciated that if the write/output frequency data is available separate from read/input frequency data, that the write/output frequency data may be used instead of combined input/output update frequency data to compute which extents to select for prewriting.

ADDITIONAL EMBODIMENT DETAILS

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, interconnected storage devices, an array of storage devices, multiple memory or storage devices or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In certain embodiments, the system of FIG. 3 may be implemented as a cloud component part in a cloud computing environment. In the cloud computing environment, the systems architecture of the hardware and software components involved in the delivery of cloud computing may comprise a plurality of cloud components communicating with each other over a network, such as the Internet. For example, in certain embodiments, the system of FIG. 3 may provide clients, and other servers and software and/or hardware components in the networked cloud, with scheduling services.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4a-4g and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer program product, for use with a host and a storage area network which includes a storage controller and storage devices, the computer program product comprising a computer readable storage medium having computer readable program code embodied therein that executes to perform operations, the operations being in the storage controller and storage devices of the storage area network, the operations comprising:
   receiving a data preservation command identifying a set of data on a source storage device to be preserved at a point in time wherein the data preservation command includes a parameter; and
   in response to the command, performing a data preservation operation including:
   establishing a relationship between storage locations of the source storage device and a target storage device;
   identifying as a function of prior update usage of the data to be preserved and the parameter of the data preservation command, a portion of the data which is more likely to be the subject of updates during at least a portion of the data preservation operation as compared to the remaining portion of the data to be preserved; and
   copying the identified portion of the data to the target storage device.

2. The computer program product of claim 1 wherein the portion of the data to be identified defines a quantity of data and the parameter defines the quantity of the portion of data to be identified.

3. The computer program product of claim 2 wherein the parameter is a percentage of the data to be preserved.

4. The computer program product of claim 2 wherein the parameter is a probability of data within the remaining portion of the data to be preserved being the subject of a collision during at least a portion of the preservation operation.

5. The computer program product of claim 1 wherein the operations further comprise:
   receiving write data to update data identified by the data preservation command; and
   writing the write data to the source storage device if the data to be updated has already been copied to the target storage device.

6. The computer program product of claim 1 wherein the operations further comprise:
   receiving write data to update data identified by the data preservation command; and
   if the data to be updated has not already been copied to the target storage device, copying the data to be updated to the target storage device, and then writing the write data to the source storage device.

7. A system for use with a host and a storage area network having a plurality of storage devices including a source storage device and a target storage device, comprising:
   a storage controller having a processor and a computer readable storage medium including code executed by the processor to perform operations, the operations comprising:
   receiving a data preservation command identifying a set of data on the source storage device to be preserved at a point in time wherein the data preservation command includes a parameter; and
   in response to the command, performing a data preservation operation including:
   establishing a relationship between storage locations of the source storage device and the target storage device;
   identifying as a function of prior update usage of the data to be preserved and the parameter of the data preservation command, a portion of the data which is more likely to be the subject of updates during at least a portion of the data preservation operation as compared to the remaining portion of the data to be preserved; and
   copying the identified portion of the data to the target storage device.

8. The system of claim 7 wherein the portion of the data to be identified defines a quantity of data and the parameter defines the quantity of the portion of data to be identified.

9. The system of claim 8 wherein the parameter is a percentage of the data to be preserved.

10. The system of claim 8 wherein the parameter is a probability of data within the remaining portion of the data to be preserved being the subject of a collision during at least a portion of the preservation operation.

11. The system of claim 7 wherein the operations further comprise:
    receiving write data to update data identified by the data preservation command; and
    writing the write data to the source storage device if the data to be updated has already been copied to the target storage device.

12. The system of claim 7 wherein the operations further comprise:
    receiving write data to update data identified by the data preservation command; and
    if the data to be updated has not already been copied to the target storage device, copying the data to be updated to the target storage device, and then writing the write data to the source storage device.

* * * * *